(12) United States Patent
Flynn

(10) Patent No.: US 6,503,553 B1
(45) Date of Patent: *Jan. 7, 2003

(54) PROCESSED DAIRY PRODUCTS

(75) Inventor: Michael Shaun Flynn, North Warrandyte (AU)

(73) Assignee: Australian Cooperative Foods Limited, North Sydney (AU)

(*) Notice: Subject to any disclaimer, the term of this patent is extended or adjusted under 35 U.S.C. 154(b) by 38 days.

This patent is subject to a terminal disclaimer.

(21) Appl. No.: 09/709,345

(22) Filed: Nov. 13, 2000

Related U.S. Application Data

(63) Continuation of application No. 08/732,493, filed on Oct. 31, 1996, now Pat. No. 5,939,126, which is a continuation-in-part of application No. 09/352,121, filed on Jul. 13, 1999, now Pat. No. 6,258,397.

(30) Foreign Application Priority Data

May 2, 1994 (AU) ............................................. PM5404

(51) Int. Cl.$^7$ ......................... A23C 9/154; A61K 47/00
(52) U.S. Cl. ....................... 426/564; 426/570; 426/573; 426/576; 426/586; 530/354; 424/439; 424/442; 424/484; 424/485; 424/488; 514/937; 514/938; 514/944; 514/945
(58) Field of Search ................................ 426/564, 570, 426/573, 576, 586; 530/354; 424/439, 442, 484, 485, 488; 514/937, 938, 944, 945

(56) References Cited

U.S. PATENT DOCUMENTS

| | | | |
|---|---|---|---|
| 3,734,745 A | 5/1973 | Cassanelli | |
| 4,012,533 A | 3/1977 | Jonas | |
| 4,254,156 A | 3/1981 | De Socio et al. | |
| 4,312,891 A * | 1/1982 | Eisfeldt | 426/564 |
| 4,578,276 A | 3/1986 | Morley | |
| 4,869,917 A | 9/1989 | Cunningham | |
| 5,352,474 A | 10/1994 | Lammers | |
| 5,520,946 A | 5/1996 | Chablaix et al. | |
| 5,614,219 A | 3/1997 | Wunderlich et al. | 424/472 |
| 5,928,664 A | 7/1999 | Yang et al. | 424/440 |
| 5,939,126 A | 8/1999 | Flynn | |
| 6,258,397 B1 * | 7/2001 | Flynn | 426/564 |

FOREIGN PATENT DOCUMENTS

| | | |
|---|---|---|
| EP | 0 191 487 | 8/1986 |
| GB | 1 307 715 | 2/1973 |
| WO | 94/21136 | 9/1994 |
| WO | WO95/29595 | * 11/1995 |

OTHER PUBLICATIONS

Abstract of JP 63–19458, dated Nov. 22, 1994.
Abstract of JP 4–187047, dated Jul. 3, 1992.
Abstract of JP 1–247034, dated Oct. 2, 1989.
Abstract if JP 63–02339, dated Aug. 22, 1988.
Charlie (1970) Food Science, the Ronald Press Co. New York, pp. 277–280.
Easy Homemade Desserts with Jello Pudding, 1977, General Foods Corporation, New York, p. 5, 60, 77, 87.
Webb 1965, Fundamentals of Dairy Chemistry, Avi Publishing Co. Inc., pp. 804–805.
Wong 1988, Fundamentals of Dairy Chemistry, Third Edition, pp. 50–52.

* cited by examiner

Primary Examiner—Carolyn Paden
(74) Attorney, Agent, or Firm—Crowell & Moring LLP

(57) ABSTRACT

A range of products and methods are based on a creamy base of cream, artificial cream, thickened cream, cream cheese, mixtures thereof and mixtures with compatible incidental ingredients, the creamy base being aerated while cold and intimately mixed with a hot aqueous gelatin solution typically around 80° C. and providing 1–3% gelatin in the mixed product and the overrun in the aeration being typically in the range of 10–40%. Various further components are included or introduced with further processing selected from methods including heating the product with a further component to boiling point whereby de-aeration and enhanced shelf life is found in the resultant product. An alternative method is where flavor components are added prior to de-aeration. Another application is as a carrier for a pharmaceutical agent which is incorporated into the creamy base and protected with the gelatin matrix, a powder being formed ready for packaging in pharmaceutical doses. Another embodiment which does not require heating is incorporating a flavoring agent and food acid to obtain a pH of 3.0 to 4.2 an adding a large volume of water which has the effect of ensuring a low viscosity and the elimination of aeration whereby a pourable sauce-like product can be achieved at refrigeration temperatures.

32 Claims, No Drawings

PROCESSED DAIRY PRODUCTS

This application is a continuation of U.S. Ser. No. 08/732,493, filed Oct. 31, 1996, now U.S. Pat. No. 5,939,126, which is a continuation-in-part of U.S. Ser. No. 09/352,121, filed Jul. 13, 1999, now U.S. Pat. No. 6,258,397.

FIELD OF THE INVENTION

The present invention relates to composite products which may have various forms but which have the commonality of combining an additive to a creamy base of a selected type whereby an edible or ingestible product of a stable character is produced.

Important applications of the invention will be to various food products but the invention also extends to other applications wherein the additive is an active medical or pharmaceutical ingredient and the creamy base acts as an effective carrier.

BACKGROUND TO THE INVENTION

The inventor's own prior patent specification PCT/AU95/00259 (now Australian patent No. 691,282 and U.S. Pat. No. 5,939,126) discloses a range of embodiments in which a creamy base is aerated and a hot aqueous solution of gelatin is rapidly and intimately mixed through the creamy base whereby the gelatin is effectively dispersed. The amount of gelatin, its concentration in the solution and the temperature of the solution needs to be selected relative to the aerated creamy base such that effective and intimate rapid distribution of the gelatin occurs whereby the base has a range of advantageous characteristics. The inventors' prior patent discloses products which can have excellent freeze/thaw stability and/or products which have an extraordinary capacity to be intimately mixed with oily products, acidic products, fruit components containing enzymes and products having an alcoholic base. These additives generally are difficult to mix intimately with a cream based food product to produce a combination for use e.g. as a sauce, mayonnaise, dessert or similar product.

The use of gelatin in the food industry is used in a wide range of applications but the particular applications the inventor's prior patent offers new and useful applications. This specification is directed to additional significant new application and production methods extending to further uses of the creamy base.

The use of gelatin is also known in the pharmaceutical industry as a coating of pharmaceutical products. One recent patent in this field is U.S. Pat. No. 5,614,219 (Wunderlich et al) which discloses, for oral administration, peptidic medicaments such as insulin distributed in a gelatin or gelatin derivative matrix.

U.S. Pat. No. 5,928,664 is a further disclosure for medicament carriers using a gelatin matrix and a glycerol matrix and other gummy delivery systems.

Thus, gelatin is well established as an acceptable food component and component for use in the pharmaceutical industry.

The present invention is directed to a range of new applications all based on new and useful applications derived from a creamy base product produced from any one of the forms of the inventor's prior patent specification and whereby novel combinations and/or novel processing conditions are proposed for additional steps so that new and useful products are derived. A major application of products of the inventor's prior patent are products which have been allowed to at least set and cool and may then either be cold-stored for good shelf life or frozen to provide extended shelf life. It is to be understood that the present invention includes applications where the creamy base product is not necessarily allowed to cool and set before additional components, as required by aspects of the present invention, are introduced. The creamy base product together with the hot aqueous gelatin solution mixed into the base product can be further processed at elevated temperature with additional components and otherwise treated in accordance with aspects of the further present invention. Alternatively, the cold, set creamy base according to the prior patent specification may be a starting ingredient for new methods and products.

SUMMARY OF THE INVENTION

According to the first aspect of the present invention, there is provided a method of producing a food product including taking a creamy base component (as defined hereinafter) mixing in a further food product before, during or after mixing in the gelatin solution;

establishing and maintaining elevated temperature conditions:
(i) to cause intimate distribution of the further food product substantially uniformly with the cream base component and
(ii) to provide increased shelf life to the product when cooled and packaged;

allowing the composite product to cool and then providing suitable storage for supply of the food product.

For the purpose of this specification, the creamy base component as defined as that derived from:

a cold base ingredient selected from the group consisting of cream, artificial cream, thickened cream, cream cheese, and mixtures thereof and mixtures with compatible incidental ingredients, the ingredient being aerated to produce an overrun and intimately mixing into the ingredient a hot aqueous solution of gelatin providing:
(A) sufficient thermal load to maintain the gelatin solution and the cold base ingredient with low enough viscosity to permit rapid and substantially uniform distribution during the mixing step;
(B) sufficient gelatin to provide the stability required in the product; and
(C) sufficient gelatin to substantially obviate breakdown or collapse of the aerated base ingredient during or after the mixing step, whereby the product has freeze/thaw stability.

Preferably, but not necessarily the method of producing the creamy base is characterised by one or more of the following conditions:
(a) the gelatin solution is at greater than 48° C. and preferably at about 80° C.;
(b) the gelatin solution causes 1%–3% by weight of gelatin in the creamy base;
(c) the aeration is to an overrun in the range of 10%–40%;
(d) the ingredient is at about 4° C. and after mixing the gelatin solution raises the product temperature to about 10° C.;
(e) mixing is conducted rapidly using a wire whisk.

An example of a creamy base is one having the following ingredients:
Cream Cheese;
Sugar;

Sweetened Condensed Milk;
Thickened Cream (0.4% gelatin and 35% milk fat);
Type B Gelatin (115–135 Bloom);
Water.

The ingredients provided added gelatin of 1.16% so that the resultant product would have a total of approximately 1.5% gelatin. The cream was thickened by conventional thickening. The manufacturing methodology used a Hobart mixer with a wire whisk agitator. The method was as follows:

1. Cream cheese and sugar was blended to a smooth paste at mixer speed 2 for approximately 3 minutes and then for a 30 second mixing at speed 3.
2. Sweetened condensed milk was added with agitation at speed 3 for approximately 90 seconds.
3. The thickened cream was added and beating occurred in the mixer on speed 3 for approximately 2 minutes and this achieved a 25% increase in volume.
4. The gelatin was formed in solution in water at near boiling point and allowed to cool to approximately 80° C. The cream pre-mix at about 10° C. then received the gelatin solution poured slowly into the mixer on speed 2 with the solution directed into the spinning whisk. It was distributed in approximately 10 to 15 seconds and then the mixer speed increased to speed 3 for a few seconds. The product was then available for use, including freezing and when desired thawing and mixing with other materials.

One important application is where by mechanical mixing, the creamy base component is substantially deaerated before or during mixing in the further food component.

Important embodiments of the invention are those in which an elevated temperature around the boiling point of the product is sustained for a period of the order of one minute and typically in the range 30 seconds to 5 minutes and preferably in the range 30 seconds to 2 minutes. In some embodiments, additional water is added to ensure that suitable product characteristics are maintained.

It is preferred that sufficient water be added to the mixture to prevent excessive reduction of the mixture, but not to leave free water in the final product.

One example of the food product is where the product is maintained at 90° C. for about 1 minute and then hot filled into a suitable container which is closed before cooling and shipment of the product.

Another example is where the product is canned and then heated to a temperature of around 120° C. and held for around 1 minute to achieve the processing whereby long life can be established.

Another application is for the final product to be frozen and stored in a frozen condition.

A further application is where the product is freeze-dried and packaged suitably for longer shelf life.

In one form, the invention has a minor proportion of the creamy base relative to the major component which is a formulated product which may have higher acidity e.g. in the range of pH 3.0 to 4.2 and may be selected from a wide range of products.

In another range of products embodying the second aspect of the invention, the product is primarily the creamy base with the minor component comprising flavoring ingredients and surprisingly, it has been found that mixing in the products into the base in a method in which the base is substantially de-aerated compared with its original form produces a stable product which can readily be formed into suitable shapes and frozen for long-term storage.

When applied to the medical field, the present invention can be applied by mixing in an active ingredient such as insulin which becomes encapsulated in the base material to facilitate effective ingestion in tablet form and absorption to the bloodstream and this is believed to be a new and useful alternative to known proposals and can permit many medicaments to be administered orally rather than by the much less preferred injection method.

More broadly, this medical application aspect can be defined as a method of producing an oral pharmaceutical comprising taking a creamy base product resulting from a process which includes taking an ingredient selected from the group consisting of cream, artificial cream, thickened cream, cream cheese, and mixtures thereof and mixtures with compatible incidental ingredients, the ingredient when cold being aerated to produce an overrun and intimately mixing into the ingredient a hot aqueous solution of gelatin providing:

(A) sufficient thermal load to maintain the gelatin solution and the cold creamy base product with low enough viscosity to permit rapid and substantially uniform distribution during the mixing step;

(B) sufficient gelatin to provide the stability required in the product; and (C) sufficient gelatin to substantially obviate breakdown or collapse of the aerated base product during or after the mixing step;

mixing in as a minor proportion of the final product an active pharmaceutical agent before, during or after mixing in the gelatin solution; forming a stable powder from the product and forming pharmaceutical doses therefrom.

Although not intended to be bound by any particular theory, the inventor suggests that the various embodiments of the invention exploit a distinct characteristic arising from the particular use of the gelatin solution with the creamy base. It is thought that the method forms a continuous three-dimensional gelatin network which surrounds gas bubbles in the aerated product and that this can be achieved by the hot aqueous gelatin solution which is greater than 50° C. and typically higher in temperature followed by suitable rapid mixing.

Many embodiments of the present invention provide surprisingly good shelf life even as a refrigerated product due to the combination of processing conditions. For example, tests have been conducted with examples based on fetta cheese and spinach, parmesan cheese and herbal additives and surprisingly it is found that by pursuing standard tests coliform of less then 10 per gram have been found along with a standard plate count cfu per gram (30° C./72 hours) of less than 10.

In the following examples the gelatin used is Type B (115–135 bloom) but the invention is not so limited and other types of gelatin may be useable.

DESCRIPTION OF EXAMPLES

Example 1

A creamy base is prepared from natural cream which is chilled to about 4° C. 5 Kg of cream cheese is dissolved in 1 litre of hot water (about 90° C.) and mixed into the cream base, and the mixture whipped with a wire whisk to an overrun of about 25%. A typical batch comprises 50 litres of cream with or without incidental ingredients and with or without artificial cream.

Approximately 900 gm of gelatin is dissolved in 5 litres of hot water (about 90° C.) and poured steadily into the cream base while stirring and vigorous distribution with a wire whisk is effected for 10–15 seconds.

The mixture is brought to a temperature of close to or at the boiling point of the mixture and held at that temperature for about 60 seconds.

The resultant product was allowed to cool and set. A texture similar to butter but of a distinct cream cheese character resulted with extended storage time at refrigeration temperature. Furthermore, the product had freeze/thaw stability and in the frozen state indefinite shelf life could be obtained.

Example 2

The product mixture was produced in accordance with Example 1; at the boiling temperature hard cheese fragments were stirred in until dissolved and uniformly distributed. The product was allowed to cool, was packaged and provided for storage and distribution. The product can be frozen or stored at refrigeration temperatures.

It is believed that the heat treatment significantly reduces microbe population and free water is essentially absent whereby a long shelf life in a refrigerated product is obtained with a pleasing battery texture of a cheese flavoured spread is obtained.

Example 3

A creamy base made in accordance with Example 1 was prepared and then cooled and allowed to set.

A pharmaceutical agent in a fluid form was mixed into the base by rapid whisking for approximately 1 minute to distribute the agent intimately and uniformly through the creamy base and substantially removing the aeration of the product. The product was then freeze-dried and tablets formed to provide dosage units.

Example 4

A creamy base was made in accordance with Example 1 and including an additional component/a pharmaceutical agent in fluid form which was added prior to mixing with hot gelatin solution. Freeze drying was effected followed by formation of dosage units.

Example 5

10 parts by weight of creamy base was made in accordance with Example 1. A mixture comprising five parts by weight of ham and five parts by weight of a Bechamel sauce (based on flour, margarine and water) is formed and the mixture rapidly whisked into the base at high speed in a manner to cause substantially de-aeration and uniform intimate distribution of the added materials to the cream base.

The resultant product is a sauce for cooking which can be formed into suitable units which are frozen and packaged for distribution and supply.

In a modified version the creamy base incorporates a Camembert style cheese. There is no heating step of the creamy base after the addition of the gelatin solution in this example.

Example 6

A creamy base is prepared in accordance with Example 1 but after incorporation of the gelatin solution, no heating is effected. In this example approximately 3 kg of a flavoring agent, e.g. garlic salt, is added together with approximately 6 kg of food acid (preferably in liquid phase such as lemon juice) together with a large volume of water (50 kg in this example) following by rapid further mixing, typically at the same speed of mixing as that in which the original aeration is effected, i.e. speed 4 on a Tonelli food mixer or speed 3 on a Hobart mixer.

The effect of this mixing is to de-aerate the product and provide a smooth creamy sauce with sufficiently low viscosity so that it is easily poured at normal refrigeration temperatures of about 40° C.

Example 7

This example is a modification of the previous example in that the flavoring agent and food acid are added quickly just before the gelatin solution is mixed into the product. After completion of the distribution of the gelatin solution, the final quantity of water is added and mixed in. Providing the food acid is rapidly mixed in and there is no delay in applying the gelatin solution it has been found that a product similar to that of the previous example is achieved.

What is claimed is:

1. A method of producing a food product comprising:
    (a) aerating a creamy base component which comprises an ingredient selected from the group consisting of cream, artificial cream, thickened cream, cream cheese, and mixtures thereof to produce an overrun and intimately mixing into the ingredient a hot aqueous solution of gelatin providing:
        (A) sufficient thermal load to maintain the gelatin solution and the cold base ingredient with low enough viscosity to permit rapid and substantially uniform distribution during the mixing step,
        (B) sufficient gelatin to provide the stability required in the product, and
        (C) sufficient gelatin to substantially obviate breakdown or collapse of the aerated base ingredient during or after the mixing step, whereby the product has freeze/thaw stability;
    (b) mixing in a further food product before, during or after mixing in the gelatin solution; and
    (c) establishing and maintaining elevated temperature conditions:
        (i) to cause intimate distribution of the further food product substantially uniformly with the cream base component; and
        (ii) to provide increased shelf life to the product when cooled and packaged; allowing the composite product to cool and then providing suitable storage for supply of the food product.

2. A method as claimed in claim 1, wherein mechanical agitation is effected on the creamy base component to reduce substantially aeration thereof.

3. A method as claimed in claim 2, wherein the creamy base is established at a temperature at or near the boiling point temperature prior to mixing in the further food product.

4. A method as claimed in claim 1, wherein boiling is conducted to reduce water content such that free water is essentially absent from the final product, whereby shelf life is enhanced.

5. A method as claimed in claim 4, further comprising adding sufficient water to the mixture to prevent excessive reduction of the mixture, but not to leave free water in the final product.

6. A method as claimed in claim 1, wherein the mixture is held for 30 seconds to 5 minutes at the elevated temperature.

7. A method as claimed in claim 1, further comprising canning the product and then subjecting it to heat treatment at about 120° C. for about 1 minute.

8. A method as claimed in claim 1, further including freezing the final product.

9. A method as claimed in claim 1, further including freeze-drying the final product to produce a powder which is packaged into product units.

10. A method as claimed in claim 1, wherein the further food product comprises about 90% by weight of the food product and provides acidity in the range pH 3.0 to 4.2.

11. A method as claimed in claim 1, wherein the creamy base product is produced from ingredients comprising a minor proportion of cream cheese and a major proportion of natural cream, with gelatin solution added at substantially greater temperature than 50° C. to the aerated creamy base product having an overrun of about 25% and at a temperature of about 5° C., the gelatin solution providing 1–3% by weight gelatin in the creamy base product.

12. A method of producing a food product comprising:
   (a) taking a creamy base product resulting from a process which comprises aerating a food component selected from the group consisting of cream, artificial cream, thickened cream, cream cheese, and mixtures thereof to produce an overrun and intimately mixing into the food component a hot aqueous solution of gelatin providing:
      (A) sufficient thermal load to maintain the gelatin solution and the cold base material with low enough viscosity to permit rapid and substantially uniform distribution during the mixing step,
      (B) sufficient gelatin to provide the stability required in the food product, and
      (C) sufficient gelatin to substantially obviate breakdown or collapse of the aerated food component during or after the mixing step, whereby the food product has freeze/thaw stability;
   (b) mixing in as a minor proportion of the final product an additional component providing flavor and/or texture and/or food value and in a form whereby it is intimately and uniformly distributed through the creamy base product; and
   (c) substantially eliminating aeration of the creamy base product by mechanical agitation before, during or after mixing in the additional component.

13. A method as claimed in claim 12, wherein the creamy base product is at a temperature in the range of about +2° C. to about +20° C., and the final food product is frozen into food units for storage and distribution.

14. A method as claimed in claim 12, wherein the additional component adds food value to the product.

15. A method as claimed in claim 12, wherein the additional component is a form selected from the group consisting of finely divided solid material, slurry, liquid, colloid and mixtures thereof.

16. A method as claimed in claim 12, wherein the creamy base product is produced from ingredients comprising a minor proportion of cream cheese and a major proportion of natural cream, with gelatin solution added at substantially greater temperature than 50° C. to the aerated creamy base product having an overrun of about 25% and at a temperature of about 5° C., the gelatin solution providing 1–3% by weight gelatin in the creamy base product.

17. A method of producing an oral pharmaceutical comprising:
   (a) taking a creamy base product resulting from a process which comprises aerating an ingredient selected from the group consisting of cream, artificial cream, thickened cream, cream cheese, and mixtures thereof when cold to produce an overrun and intimately mixing into the ingredient a hot aqueous solution of gelatin providing:
      (A) sufficient thermal load to maintain the gelatin solution and the cold creamy base product with low enough viscosity to permit rapid and substantially uniform distribution during the mixing step,
      (B) sufficient gelatin to provide the stability required in the product, and
      (C) sufficient gelatin to substantially obviate breakdown or collapse of the aerated base product during or after the mixing step; and
   (b) mixing in as a minor proportion of the final product an active pharmaceutical agent before, during or after mixing in the gelatin solution; and
   (c) forming a stable powder from the product and forming pharmaceutical doses therefrom.

18. A method as claimed in claim 17, wherein the product is freeze-dried and formed into tablets.

19. A method as claimed in claim 17, wherein prior to forming a stable powder, the mixture is mechanically agitated substantially to remove aeration.

20. A method as claimed in claim 17, wherein the creamy base product is produced from ingredients comprising a minor proportion of cream cheese and a major proportion of natural cream, with gelatin solution added at substantially greater temperature than 50° C. to the aerated creamy base product having an overrun of about 25% and at a. temperature of about 5° C., the gelatin solution providing 1–3% by weight gelatin in the creamy base product.

21. A method of producing a creamy sauce which is pourable at refrigeration temperatures comprising:
   (a) taking a creamy base product resulting from a process which comprises aerating a food component selected from the group consisting of cream, artificial cream, thickened cream, cream cheese, and mixtures thereof to produce an overrun and intimately mixing into the food component a hot aqueous solution of gelatin providing:
      (A) sufficient thermal load to maintain the gelatin solution and the cold base material with low enough viscosity to permit rapid and substantially uniform distribution during the mixing step,
      (B) sufficient gelatin to provide the stability required in the creamy sauce, and
      (C) sufficient gelatin to substantially obviate breakdown or collapse of the aerated food component during or after the mixing step;
   (b) mixing in a food flavoring agent and a food acid immediately prior to the mixing in of the hot aqueous gelatin solution or after that mixing step, the food acid being in sufficient quantity to provide a ph in the final product of approximately 3.0 to 4.2; and
   (c) mixing in a sufficient volume of water to substantially eliminate aeration and to provide a sufficiently low viscosity whereby the final product at refrigeration temperature is pourable.

22. A method as claimed in claim 21 wherein the flavoring agent and food acid are mixed in after the aqueous gelatin solution has been mixed in and the volume of water mixed in yields in the final product total water in excess of 50% by weight, whereby a pourable product having a shelf life of the order of 30 days is produced.

23. A method as claimed in claim 21, wherein the creamy base product is produced from ingredients comprising a minor proportion of cream cheese and a major proportion of natural cream, with gelatin solution added at substantially greater temperature than 50° C. to the aerated creamy base product having an overrun of about 25% and at a temperature of about 5° C., the gelatin solution providing 1–3% by weight gelatin in the creamy base product.

24. A method of producing a product for oral ingestion comprising:
  (a) aerating a creamy base component comprising an ingredient selected from the group consisting of cream, artificial cream, thickened cream, cream cheese, and mixtures thereof to produce an overrun and intimately mixing into the ingredient a hot aqueous solution of gelatin providing:
    (A) sufficient thermal load to maintain the gelatin solution and the cold base ingredient with low enough viscosity to permit rapid and substantially uniform distribution during the mixing step,
    (B) sufficient gelatin to provide the stability required in the product, and
    (C) sufficient gelatin to substantially obviate breakdown or collapse of the aerated base ingredient during or after the mixing step, whereby the product has freeze/thaw stability;
  (b) mixing in at least one further ingredient before, during or after mixing in the gelatin solution.

25. A method as claimed in claim 24, wherein said further ingredient is a further food product, further comprising establishing and maintaining elevated temperature conditions:
  (i) to cause intimate distribution of the further food product substantially uniformly with the cream base component, and
  (ii) to provide increased shelf life to the product when cooled and packaged; allowing the composite product to cool and then providing suitable storage for supply of the food product.

26. A method as claimed in claim 24, wherein said further ingredient is an active pharmaceutical agent in a minor proportion of the final product; further comprising forming a stable powder from the product and forming pharmaceutical doses therefrom.

27. A method as claimed in claim 24, wherein said at least one further ingredient is a food flavoring agent and a food acid, the food acid being in sufficient quantity to provide a pH in the final product of approximately 3.0 to 4.2, further comprising mixing in a sufficient volume of water to substantially eliminate aeration and to provide a sufficiently low viscosity whereby the final product at refrigeration temperature is pourable.

28. A product of the method as claimed in any one of claims 12, 17, 21, 24.

29. A method of producing a product comprising:
  (a) aerating a creamy base component comprising an ingredient selected from the group consisting of cream, artificial cream, thickened cream, cream cheese, and mixtures thereof to produce an overrun and intimately mixing into the ingredient a hot aqueous solution of gelatin providing:
    (A) sufficient thermal load to maintain the gelatin solution and the cold base ingredient with low enough viscosity to permit rapid and substantially uniform distribution during the mixing step,
    (B) sufficient gelatin to provide the stability required in the product, and
    (C) sufficient gelatin to substantially obviate breakdown or collapse of the aerated base ingredient during or after the mixing step, whereby the product has freeze/thaw stability;
  (b) mixing in at least one further ingredient before, during or after mixing in the gelatin solution.

30. A method as claimed in claim 29, wherein said further ingredient is a further food product, further comprising establishing and maintaining elevated temperature conditions:
  (i) to cause intimate distribution of the further food product substantially uniformly with the cream base component, and
  (ii) to provide increased shelf life to the product when cooled and packaged; allowing the composite product to cool and then providing suitable storage for supply of the food product.

31. A method as claimed in claim 29, wherein said further ingredient is an active pharmaceutical agent in a minor proportion of the final product; further comprising forming a stable powder from the product and forming pharmaceutical doses therefrom.

32. A method as claimed in claim 29, wherein said at least one further ingredient is a food flavoring agent and a food acid, the food acid being in sufficient quantity to provide a pH in the final product of approximately 3.0 to 4.2, further comprising mixing in a sufficient volume of water to substantially eliminate aeration and to provide a sufficiently low viscosity whereby the final product at refrigeration temperature is pourable.

* * * * *